United States Patent Office 3,086,841
Patented Apr. 23, 1963

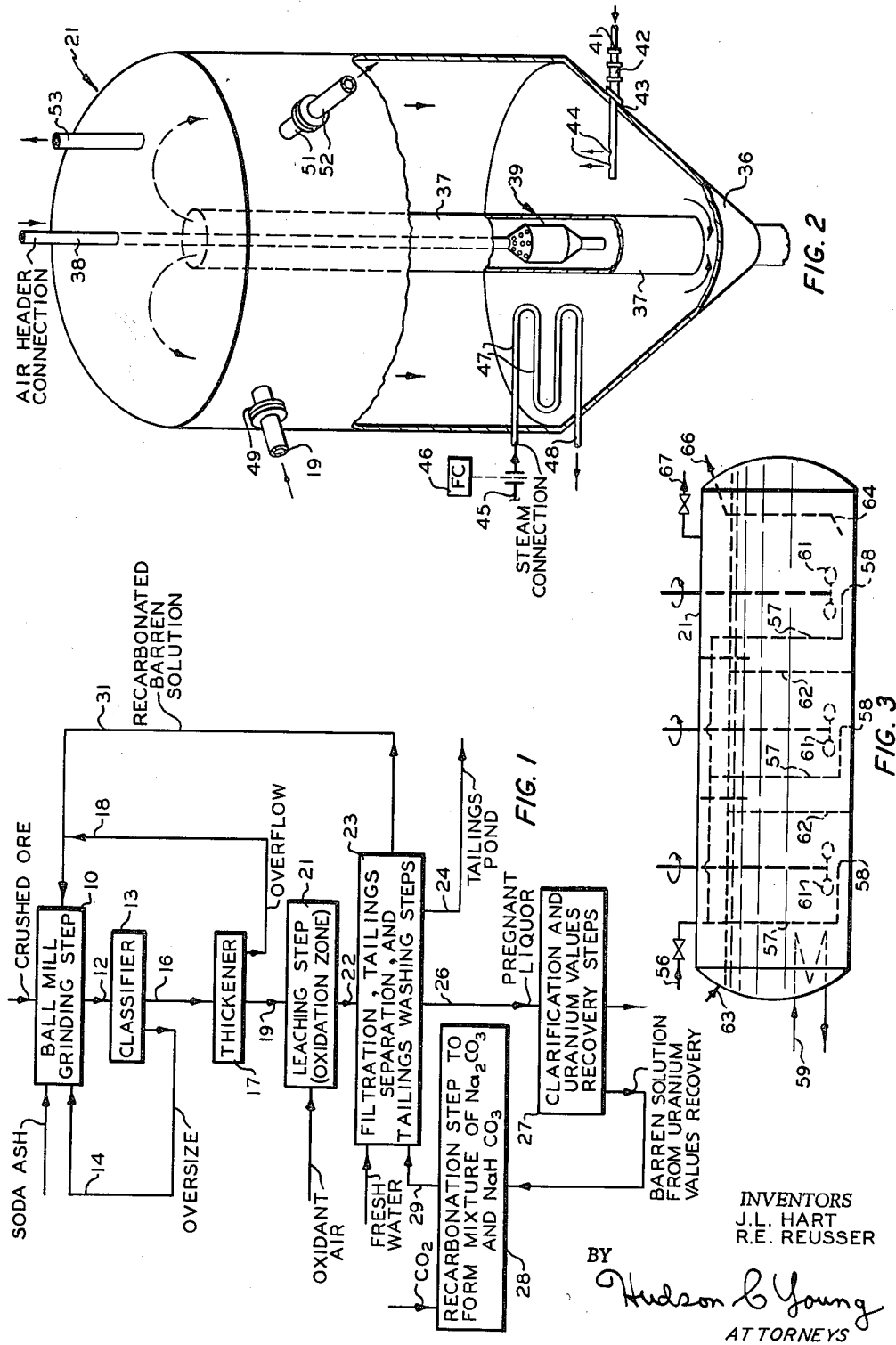

3,086,841
METHOD FOR PREVENTION OF PLUGGING OF AERATION TUBES IN THE LEACHING OF URANIUM ORES
James L. Hart and Robert E. Reusser, Bartlesville, Okla., assignors to Phillips Petroleum Company, a corporation of Delaware
Filed Oct. 21, 1959, Ser. No. 847,800
13 Claims. (Cl. 23—14.5)

This invention relates to a method for the prevention of plugging of aeration tubes used in the leaching of uranium ores. In another aspect it relates to a method for preventing the plugging of perforated or fritted tubes, of metal or ceramic material, which are utilized for supplying air to a leach slurry, by coating the tubes with silicon-containing compounds.

Among the processes for concentrating uranium values from their ores are those involving preparing an ore slurry in the presence of an acid or carbonate leaching solution and passing oxidant air therethrough. In this manner, a part of the ore is converted to a hexavalent, water-soluble uranium compound, forming, what is termed in the art, the pregnant liquor. The inert solids from the leaching step are disposed of, and the dissolved uranium values are recovered from the liquor by any of several conventional methods.

In carrying out the leaching of uranium ores, after the ore is ground and mixed with leach solution, the resulting slurry is contacted with air in either an open vessel at atmospheric pressure, such as a Pachuca tank, or in an autoclave operating at superatmospheric pressure. In either case, the air is passed through the leach solution by means of a multiplicity of aeration tubes, preferably porous or fritted in construction. One problem which has not been solved is the eventual plugging of these tubes by precipitated salts. While complete plugging requires an appreciable length of time, the increasing pressure drop, resulting from partial plugging of the aeration tubes, requires a steady increase in air injection pressure to maintain the initial air flow rate, until such time as complete stoppage of air flow occurs from total plugging of the tubes.

We have discovered that the plugging of the aeration tubes, being utilized for the introduction of air into vessels wherein uranium-containing ores are being leached, can be prevented by coating the tubes on their internal surfaces with an organic silicon compound.

By the practice of this invention, the required throughput of air in the leaching vessels can be maintained at a steady input pressure and there are few, if any, process shutdowns for tube removal and cleaning out of precipitated salts. Moreover, the treatment of this invention decreases the initial air pressure required to force a given volume of air through the tubes.

It is an object of this invention to provide an improved method of leaching uranium ores with an acid or carbonate leaching solution. It is also an object to substantially prevent plugging of aeration tubes used in the leaching of uranium-bearing minerals. It is a further object to avoid the plugging of the perforated or fritted tubes used for supplying air to a leach slurry by coating the tubes with silicon-containing compounds. Other objects, as well as aspects and advantages inherent in the process, will become apparent on studying the accompanying disclosure and drawing.

FIGURE 1 is a process diagram depicting the carbonate leach process for the recovery of uranium values from their ores;

FIGURE 2 is a view in partial section of a Pachuca tank containing aeration tubes and is an example of the equipment used in leaching step 21 of FIGURE 1; and FIGURE 3 is a perspective view of an autoclave containing aeration tubes that is another type of equipment used in leaching step 21 of FIGURE 1.

A description of one of the two proven methods for recovery of uranium values which can utilize the method of this invention follows. The well known carbonate leach process has been adapted to the processing of uranium ores to extract uranium values. This invention briefly comprises wet grinding the crushed ore in the presence of sodium carbonate and sodium bicarbonate, leaching a resulting ore slurry containing about 50 percent solids to convert the uranium values to the soluble sodium uranyl tricarbonate complex, filtering the resulting pregnant liquor slurry containing uranium values to remove inert solids therefrom, clarifying the filtrate (pregnant liquor), and recovering uranium values therefrom, usually by precipitating sodium diuranate by the addition of sodium hydroxide. Then follows the thickening, filtering, washing and drying of this yellow cake precipitate. The overflow from the yellow cake thickener is recycled to the process after first being recarbonated. Other methods may be employed for recovering the uranium values from the pregnant liquor, such as, ion exchange or solvent extraction. Some examples of ores currently being processed are uraninite, coffinite, carnotite, and the like.

Reference will now be made to the accompanying drawing, wherein like parts have been designated with like reference numbers.

Referring to FIGURE 1, and beginning at the top of the diagram, crushed, uranium-bearing ore and soda ash are introduced to the ball mill grinding zone 10 wherein the ore is ground to a fine condition in the presence of water, sodium carbonate (soda ash) and sodium bicarbonate. An ore slurry leaves the ball mill and passes on through conduit 12 to classifier 13 wherein oversized particles are returned to the ball mill 10 via conduit 14, and the remaining fine ore slurry passes through line 16 to a thickener 17. From the thickener, overflow is returned via conduit 18 to the grinding step, while the thickened slurry goes on through conduit 19 to the leaching equipment 21 wherein the oxidation and dissolution of the resulting hexavalent uranium compound takes place. That is, the slurry is contacted with oxygen by passing air therethrough, and is maintained at a predetermined temperature and pressure for a period of time sufficient to cause the uranium values to go into solution as the sodium uranyl tricarbonate complex, forming what is termed in the art, the pregnant liquor.

The leaching equipment, which is either a plurality of Pachuca tanks or autoclaves, depending upon the operating pressures desired, contain the aeration tubes which cause the operating difficulties solved by this invention.

The pregnant liquor leaves oxidation zone 21 through conduit 22 and enters the vacuum drums filtration zone 23 wherein said liquor is filtered to remove the inert solids, usually called tailings. These tailings are washed and sent to disposal in a tailings pond via conduit 24. The filtrate, still the pregnant liquor, moves on through conduit 26 to a series of steps 27 including clarification, precipitation or other recovery means, thickening, washing and drying. Barren solution from these final recovery steps is recarbonated with $CO_2$ in zone 28 and then recycled through conduit 29 to vacuum drum zone 23. The recarbonated barren solution, after it has been used to wash the tailings in zone 23, is recycled through conduit 31 to grinding zone 10 to provide the sodium bicarbonate solution for the wet grinding step.

Referring to FIGURE 2, a Pachua tank generally designated 21, is shown in partial cross section. The tank is a cylindrical vessel of variable height, but generally with a height several times its diameter in this application to facilitate circulation and oxidation of the ore slurry. The lower end of the tank terminates in a cone-shaped base 36. Within the tank is a centrally disposed air lift riser pipe 37. Centrally disposed within riser pipe 37 is an air line 38, entering through the top of tank from an air header (not shown), and terminating near the bottom of pipe 37 is an air lift air distributor 39. This distributor directs the air stream in an upwardly direction, thereby providing the motive power for pulp circulation in tank 21.

Oxygen for the leaching process is supplied from a conventional compressed air source (not shown), and is conducted to the circular air header (not shown), positioned external to the tank cone. The header is provided with connections 41 for securing horizontal aeration tubes. The compressed air passes from the header into a multiplicity of these aeration tubes 42, one of which is shown as representative. These tubes are directed inwardly through the coned section of the Pachuca tank wall about level 43, converging from the air header in a radial manner upon riser pipe 37, but terminating short of it. The tubes, whether of metal or ceramic, may be perforated or fritted on their inner ends 44 to allow good dispersal of the air into the slurry. It is at the openings in the aeration tubes that the precipitation and build-up of salts occurs which leads to the plugging of the tubes.

The heat supply for the leaching operation in the Pachuca is provided by steam line 45 having flow controller valve 46 located therein. The steam, after entering via line 45 and having its flow adjusted to maintain a tank temperature of about 100° C., passes through the heating coil 47 and then is returned through a condensate line 48 back to the boiler (not shown).

Ore slurry from the thickeners (not shown) is pumped through line 19 into the Pachuca at an inlet 49 preferably just below the surface of the liquid in the Pachuca. The resulting pregnant liquor slurry is drawn off through an opposing overflow outlet 51 disposed at a point at which the liquid level in the Pachuca is sought to be maintained. This slurry passes on through line 52 to subsequent filtration and uranium values recovery. A second outlet pipe 53 is provided leading from the top of the tank for the conducting way of off-gas, mostly oxygen-depleted air, from the surface of the slurry to an off-gas header (not shown).

Referring now to FIGURE 3, an autoclave, generally designated 21, is another embodiment of this invention shown in full section. The autoclave is a closed cylindrical vessel, employed in a horizontal position, with a length usually several times its diameter to provide a sufficient retention time for oxidation of the ore slurry.

Oxygen for the leaching process is also supplied from a conventional compressed air source (not shown). The compressed air stream passes through a controller valve 56 and then is divided to pass to a number of aeration tubes 57 which eject air into the liquid slurry near the bottom of the autoclave. These aeration tubes may also be perforated or fritted on their inner ends 58 to permit dispersal of smaller air bubbles into the slurry. It is at these openings that plugging of the aeration tube of the autoclave will occur.

The heat supply for the leaching operation is provided by a steam coil 59, controlled and operated in the same manner as coil 47 of FIGURE 2, so as to maintain the vessel operating temperature between 110° and 135° C.

The autoclave is provided with several motor-driven paddle means 61 for agitating the ore slurry so as to promote intimate contact of ore particles and oxygen. One paddle is located in each section of the autoclave which is partitioned off by baffle means 62, rising up to the slurry level. This baffling causes one-way movement of the ore slurry from the inlet point 63 to the outlet line 66 of the vessel. The ore slurry is fed in above the slurry level at point 63 and withdrawn at the opposite end through outlet 64 in the bottom of the vessel. The resulting pregnant liquor slurry passes on through line 66 to filtration and uranium valves recovery. An outlet conduit 67 is provided in the top of the autoclave, above the slurry level, for conducting away off-gases from the surface of the liquid to disposal at a rate designed to maintain the operating pressure in the autoclave.

Although the present invention finds greatest utility in the carbonate leaching of uranium as hereinbefore described, the coating of the aeration tubes with the above-described silicon-containing materials can also be employed in the well-known acid leaching process for the recovery of uranium from ores containing this element. In this process, the uranium-containing ore is comminuted to a fine particle size, slurried in water and classified, these steps being essentially the same as in carbonate leaching. The clarified pulp is then contacted with sulfuric acid under oxidizing conditions to convert the tetravalent uranium to hexavalent uranium which dissolves in the acid. Pachuca tanks and autoclaves are employed, but Pachucas are preferred. The leaching conditions most commonly employed are 50 percent pulp density, pH of 1–2, temperatures of 40–60° C., and leaching times of 40 to 80 hours. Higher temperatures are usually not employed, since corrosion difficulties arise, and increased solubilization of silicates, sulfides, phosphates and the like occur. In contrast to carbonate leaching, smaller air rates are employed in acid leaching, but this is compensated by the addition of supplemental oxidants, such as $MnO_2$.

After the acid leaching step is completed, the pregnant leach liquor is filtered and clarified in the same manner as is carried out in carbonate leaching. Recovery of the uranium from the pregnant solution can be carried out by precipitation, ion-exchange and the like. Precipitation is most widely used, and many different types of precipitating agents are employed. Some examples of precipitating agents are ammonia, hydrogen peroxide, sodium, and the like. Bases are most commonly employed, as it is necessary to raise the pH from 2.5 to 6.0, depending upon the precipitant, before precipitation occurs. Most of these agents use up sulfuric acid, and in many plants, no recycle of leach liquor is carried out after the precipitated uranium compounds are removed by filtration.

The usual source of supply of oxygen for the leaching process is compressed air, compressed directly from the atmosphere, because it is the cheapest source of oxygen available. However, it is obvious that any free oxygen-containing gas may be employed provided the non-oxygen portion thereof is substantially inert to the process, just as the nitrogen which makes up ⅘ of the atmosphere is inert when air is employed, and minor amounts of combustion gases, such as carbon monoxide and/or carbon dioxide; also natural gas, or the like, are also inert. It is obvious that the employment of oxygen-enriched air or substantially pure oxygen will accelerate the oxidation process and may be used if such acceleration is worth the additional cost of the oxygen enrichment. For this reason, it is desired to claim free oxygen-containing gas although economics cause air to be used as said gas in most instances.

In operation of the leaching equipment, whether Pachuca tanks or autoclaves, observations made on the aeration tubes during leaching showed that a wet film of solution tends to flow back into the tubes, and air passing through the tubes evaporates the solution, causing the deposit of precipitated salts within the tubes. As leaching continues over an extended period of time, these salts tend to close the opening in the tube, and will eventually plug up all these air outlets, thus completely stopping the flow of air.

It is now discovered that the plugging of tubes being utilized for the introduction of air into vessels wherein uranium-containing ores are being leached by carbonate or acid leach liquors can be prevented by coating said tubes on their inner surfaces with an organic silicon compound, preferably one selected from the four formulas

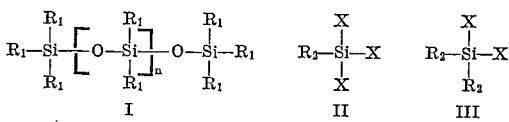

and

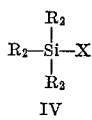

wherein $R_2$ is selected from the group consisting of phenyl and alkyl radicals containing from 1 to 18 carbon atoms, wherein each $R_1$ is selected from the group consisting of methyl and phenyl, wherein X is selected from the group consisting of chlorine and bromine, and wherein $n$ has a value such that the siloxane polymer will have a viscosity within the range between 20 and 2,500,000 centistokes at 25° C., including liquids, greases and other semi-solids. In general, organic silicon compounds can be employed with successful results in the practice of this invention, but those of the four Formulas I to IV above are preferred because of their superior coating properties.

Some examples of organosilanes within the scope of the above Formulas II, III and IV which can be employed in the process of this invention are:

methyltrichlorosilane,
methyltribromosilane,
n-propyltrichlorosilane,
n-hexyltribromosilane,
sec-octyltribromosilane,
n-decyltrichlorosilane,
n-octadecyltrichlorosilane,
dimethyldichlorosilane,
dipentyldichlorosilane,
propylbutyldibromosilane,
ditetradecyldichlorosilane,
dioctadecyldibromosilane,
trimethylchlorosilane,
trimethylbromosilane,
trinonylbromosilane,
tripentadecylchlorosilane,
trioctadecylchlorosilane,
phenyltrichlorosilane,
phenyltribromosilane,
diphenyldichlorosilane,
diphenyldibromosilane,
triphenylbromosilane,
triphenylchlorosilane, and
phenylmethyloctadecylbromosilane.

The siloxanes, including polydimethylsiloxanes and polydiphenylsiloxanes, are known in the art, many of which are available commercially. The polydimethylsiloxanes, the preferred organic silicon compounds, are sold under the trade names DC Antifoam A and DC 200 Fluids, all marketed by the Dow Corning Corporation, and those having a viscosity of from 20 to 2,500,000 centistokes at 25° C. are useful in the present invention. Within this range, it is preferred to utilize those siloxanes of a viscosity of greater than 100 centistokes at 25° C.

As described above, a number of these silicon-containing compounds can be employed as coating agents for the aeration tubes. These coating agents can be applied to the inner surfaces of the tubes by several methods. The fairly high molecular weight polydimethylsiloxanes can be applied by mechanically coating the tubes, and this method will probably be the only satisfactory method for utilizing these compounds, since the viscosity is sufficiently high to render spraying impractical, and these materials are not sufficiently volatile to allow one to apply them as gas. Treatment should be sufficient to give a coating between 0.05 and 5.0 mils thickness. As much of the inner surface area of the tubes as may be contacted with leach liquor, is coated with one of the compounds of this invention, and at least for the length of the perforated section. In general, the inner surfaces are coated from the ends within the leaching vessel back to a point one foot beyond the tube opening farthest from said internal ends.

On the other hand, many of the organo silanes of Formulas II, III and IV, as shown above, are sufficiently volatile to allow one to apply these materials in the form of a gas. These silicon-containing compounds can be applied to aeration tubes which are made of many different types of materials. Both perforated and fritted tubes of steel, nickel, and baked vitreous material can be coated. It is particularly desirable to apply the organosilanes, as described above, to fritted tubes in the form of a vapor. Condensation of the vaporized organosilanes on the fritted tubes supplies an adequate coating of the silicon-containing material. With fritted tubes, only so much of the tube length as is fritted need be coated.

Whereas one might suspect the method by which these silicon-containing compounds prevent the plugging of the tubes is one involving surface tension, apparently this is not the only factor involved. If surface tension alone brought about the effect, other materials of low surface tension might also work, and it has been shown that such material as polyethylene and polymers of tetrafluoroethylene are not satisfactory in preventing plugging.

The following specific examples are intended to illustrate the effectiveness of the silicon-containing coating agents of this invention. However, it is not intended that the process be limited to the particular embodiments shown therein.

*Examples*

A number of runs were carried out in which aeration tubes were inserted into a vessel containing carbonate leach slurry, after which the temperature of the carbonate leach liquor was raised to approximately 90° C. Air was injected through the tubes through a line from an air meter through a mercury manometer. The air rate was recorded on the air meter, and the back pressure developed by gradual plugging of the tube was measured on the manometer. In this manner, a degree of plugging could be determined at any time during the run. The following results were obtained: An untreated open-ended 7 millimeter glass tube was almost completely plugged in 7 hours, whereas an identical glass tube which had been treated with a polydimethylsiloxane sold under the trade name of DC Antifoam A was still passing air at the full rate after 48 hours.

A coarse fritted glass dispersing tube which was not treated developed a back pressure of 72 millimeters mercury in 93 hours from a starting pressure of 37 millimeters mercury. A coarse fritted glass dispersing tube of the same size, which had been treated with methyltrichlorosilane by mechanical application developed only 15 millimeters mercury back pressure from a starting pressure of 6 millimeters. The time in this run was identical to the control run.

A new coarse fritted glass dispersing tube which had not been treated developed a back pressure of 114 millimeters mercury in 65 hours from a starting pressure of 36 millimeters mercury. The air flow at the end of this time was only one-half of the starting rate. This partially plugged tube was then removed, washed and treated with methyltrichlorosilane by mechanical application. The tube was then replaced in the leach liquor, and after 71 hours, the back pressure had increased to 31 millimeters mercury from a starting pressure of 4 millimeters mercury. Note that this treatment with the silane reduced the starting pressure from 36 to 4 millimeters of mercury, which is an unexpected advantageous result thereof. The air flow at the end of this time was 100 percent of the starting rate.

A steel, open-ended aeration tube of ⅛ inch diameter and 0.154 which wall thickness which had not been treated, completely plugged off in 40 hours. The same tube was then treated with polydimethylsiloxane of the formula

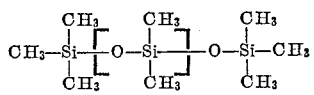

of a viscosity of approximately 100,000 centistokes at 25° C. The treatment of the tube with this material was carried out by mechanical application, and a back pressure of 42 mm. of mercury built up from a starting pressure of 4 mm. mercury after 46 hours. The flow rate at the end of 46 hours was 100 percent of the starting rate.

We claim:

1. In a process for the oxidation of tetravalent uranium to hexavalent uranium with free oxygen-containing gas which comprises oxidizing an aqueous slurry of comminuted uranium-containing ore in the presence of a leaching solution in a leaching zone, by blowing said free oxygen-containing gas into said leaching zone through at least one aeration tube having an inside diameter at least 0.125 inches, forming a pregnant liquor containing a dissolved water soluble hexavalent uranyl compound, and recovering uranium values from said pregnant liquor, the improvement which comprises coating the internal surface of said aeration tube prior to said tube being disposed below the slurry level in said leaching vessel with an organic silicon compound selected from the group consisting of

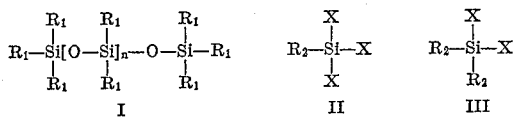

and

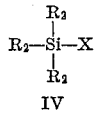

wherein each $R_1$ is selected from the group consisting of methyl and phenyl, wherein each $R_2$ is selected from the group consisting of phenyl and alkyl radicals containing from 1 to 18 carbon atoms, wherein $n$ has a value such that the siloxane polymer will have a viscosity within the range between 20 and 2,500,000 centistokes at 25° C., wherein X is selected from the group consisting of chlorine and bromine, thereby substantially preventing the plugging of the openings at the inner end of said aeration tube by precipitated salts and thereby minimizing shutdown of said leaching vessel for removal of said aeration tube and cleaning out of said precipitated salts.

2. The process according to claim 1 in which said organic silicon compound is

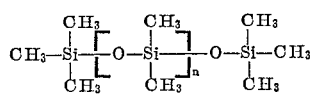

wherein said $n$ being an integer resulting in a compound having a viscosity of approximately 100,000 centistokes at 25° C.

3. The process of claim 1 in which the organic silicon compound is

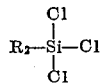

said $R_2$ being selected from the group consisting of the phenyl and alkyl radicals containing from 1 to 18 carbon atoms.

4. The process of claim 1 in which the organic silicon compound is

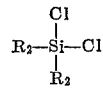

said $R_2$ being selected from the group consisting of the phenyl and alkyl radicals containing from 1 to 18 carbon atoms.

5. The process of claim 1 in which the organic silicon compound is

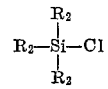

said $R_2$ being selected from the group consisting of the phenyl and alkyl radicals containing from 1 to 18 carbon atoms.

6. The process according to claim 1 wherein said leaching zone is a Pachuca tank.

7. The process according to claim 1 wherein said leaching zone is an autoclave.

8. In a process for the oxidation of tetravalent uranium to hexavalent uranium with free oxygen-containing gas which comprises oxidizing aqueous slurry of comminuted uranium-containing ore in the presence of sodium carbonate and sodium bicarbonate in a leaching zone, by blowing said free oxygen-containing gas into said leaching zone through at least one aeration tube having an inside diameter at least 0.125 inch, forming a pregnant liquor containing a dissolved water soluble hexavalent uranyl compound, sodium uranyl tricarbonate, and recovering uranium values from said pregnant liquor, the improvement which comprises coating the internal surface of said aeration tube prior to the said tube being disposed below the slurry level in said leaching vessel with an organic silicon compound selected from the group consisting of

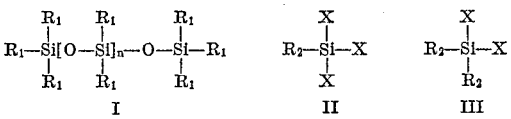

and

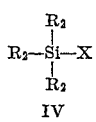

wherein each $R_1$ is selected from the group consisting of methyl and phenyl, wherein each $R_2$ is selected from the group consisting of phenyl and alkyl radicals containing from 1 to 18 carbon atoms, wherein $n$ has a value such that the siloxane polymer will have a viscosity within the range between 20 and 2,500,000 centistokes at 25° C., wherein X is selected from the group consisting of chlorine and bromine, thereby substantially preventing the plugging of the openings at the inner end of said aeration tube by precipitated salts and thereby minimizing shutdown of said leaching vessel for removal of said aeration tube and cleaning out of said precipitated salts.

9. In a process for the oxidation of tetravalent uranium to hexavalent uranium with free oxygen-containing gas which comprises oxidizing aqueous slurry of comminuted uranium-containing ore in the presence of dilute sulfuric acid in a leaching zone, by blowing said free oxygen-containing gas into said leaching zone through at least one aeration tube having an inside diameter at least 0.125 inch, forming a pregnant liquor containing a dissolved water soluble hexavalent uranyl sulfate, and recovering uranium values from said pregnant liquor, the improvement which comprises coating the internal surface of said aeration tube prior to the said tube being disposed below the slurry level in said leaching vessel with an organic silicon compound selected from the group consisting of

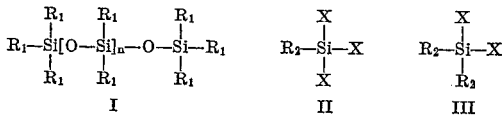

and

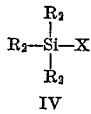

wherein each $R_1$ is selected from the group consisting of methyl and phenyl, wherein each $R_2$ is selected from the group consisting of phenyl and alkyl radicals containing from 1 to 18 carbon atoms, wherein $n$ has a value such that the siloxane polymer will have a viscosity within the range between 20 and 2,500,000 centistokes at 25° C., wherein X is selected from the group consisting of chlorine and bromine, thereby substantially preventing the plugging of the openings at the inner end of said aeration tube by precipitated salts and thereby minimizing shutdown of said leaching vessel for removal of said aeration tube and cleaning out of said precipitated salts.

10. The process according to claim 1 wherein said comminuted ore is coffinite.
11. The process according to claim 1 wherein said comminuted ore is carnotite.
12. The process according to claim 1 wherein said comminuted ore is uraninite.
13. A process for the oxidation of tetravalent uranium to hexavalent uranium comprising: disposing at least one aeration tube having an inside diameter of at least 0.125 inch and previously coated on the internal surface thereof with an organic silicon compound selected from the group consisting of

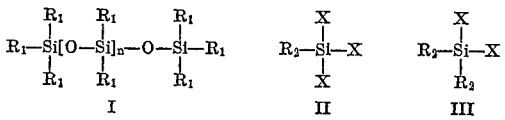

and

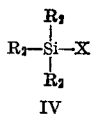

wherein each $R_1$ is selected from the group consisting of methyl and phenyl, wherein each $R_2$ is selected from the group consisting of phenyl and alkyl radicals containing from 1 to 18 carbon atoms, wherein $n$ has a value such that the siloxane polymer will have a viscosity within the range between 20 and 2,500,000 centistokes at 25° C., wherein X is selected from the group consisting of chlorine and bromine below the slurry level in a leaching zone; oxidizing an aqueous slurry of comminuted uranium-containing ore in the presence of a leaching solution in said leaching zone by blowing a free-oxygen containing gas through said tube; forming a pregnant liquor containing a dissolved water soluble hexavalent uranyl compound and recovering uranium values from said pregnant liquor, thereby substantially preventing the plugging of the openings at the inner end of said aeration tube by precipitated salts and thereby minimizing shutdown of said leaching vessel for removal of said aeration tube and cleaning out of said precipitated salts.

References Cited in the file of this patent
UNITED STATES PATENTS

| | | |
|---|---|---|
| 2,813,003 | Thunaes et al. | Nov. 12, 1957 |
| 2,815,261 | Thunaes et al. | Nov. 12, 1957 |

OTHER REFERENCES

Nuclear Science Abstracts, vol. 14, Abstract No. 22815, November 30, 1960, citing Stackelberg et al., "Leybold Polarograph Ber.," vol. 1, No. 4, pp. 55–58 (1953), N.S.A. Abstract available from POSL and a translation of the "Leybold" text is available as AEC-tr-4196 from the Atomic Energy Commission. The 1953 date is relied on.

Clegg et al.: "Uranium Ore Processing," pages 125–138, 151, 152, 162–171 (1958), Addison-Wesley Publ. Co., Reading, Pa.

Perry: "Chemical Engineers Handbook," 3rd edition, pages 1510, 1523, 1524, 1535, 1537 (1950).

Kirk and Othmer, "Encyclopedia of Chemical Technology," vol. 12, pages 377, 380, 386, 388, 393–412 (1954).